US012608329B2

(12) United States Patent
Agarwal et al.

(10) Patent No.: US 12,608,329 B2
(45) Date of Patent: Apr. 21, 2026

(54) ADAPTIVE REORDERING TECHNIQUE FOR EFFICIENT FLIT PACKAGING AND PERFORMANCE OPTIMIZATIONS

(71) Applicant: Micron Technology, Inc., Boise, ID (US)

(72) Inventors: Nikesh Agarwal, Boise, ID (US); Robert M. Walker, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 175 days.

(21) Appl. No.: 18/598,791

(22) Filed: Mar. 7, 2024

(65) Prior Publication Data

US 2024/0320177 A1 Sep. 26, 2024

Related U.S. Application Data

(60) Provisional application No. 63/491,487, filed on Mar. 21, 2023.

(51) Int. Cl.
*G06F 13/36* (2006.01)
*G06F 13/40* (2006.01)
*G06F 13/42* (2006.01)

(52) U.S. Cl.
CPC ...... *G06F 13/4013* (2013.01); *G06F 13/4221* (2013.01)

(58) Field of Classification Search
CPC ......................... G06F 13/4013; G06F 13/4221
See application file for complete search history.

(56) References Cited

U.S. PATENT DOCUMENTS

| | | | | |
|---|---|---|---|---|
| 2022/0066636 A1* | 3/2022 | Taki | ...................... | G06F 3/0679 |
| 2023/0342323 A1* | 10/2023 | Ali | ...................... | G06F 13/4221 |
| 2024/0256441 A1* | 8/2024 | Hyatt | ................... | G06F 12/109 |

* cited by examiner

*Primary Examiner* — Henry Tsai
*Assistant Examiner* — Kim T Huynh
(74) *Attorney, Agent, or Firm* — Wood IP, LLC; Theodore A. Wood

(57) ABSTRACT

A system comprising an interface between a host and a device, wherein the interface is configured to reorder messages to package flits to reduce or eliminate underutilized bandwidth in one or both directions of a bidirectional link. In one example, the interface is in accordance with the CXL specification, and the host and the device (e.g., a memory device) include CXL-compliant controllers to pack and unpack flits.

20 Claims, 6 Drawing Sheets

ADAPTIVE REORDERING TECHNIQUE FOR EFFICIENT FLIT PACKAGING AND PERFORMANCE OPTIMIZATIONS

CROSS-REFERENCE TO RELATED APPLICATION

This application claims benefit to U.S. Provisional Patent Application No. 63/491,487, filed Mar. 21, 2023, the disclosure is incorporated herein by reference in its entirety.

FIELD OF TECHNOLOGY

The present disclosure relates to improving bandwidth utilization in communication links and in particular improving bandwidth utilization by reordering different types of messages.

BACKGROUND

It is usually desired that interconnection networks and links have as low a latency as possible. That is, it is desired that the time taken to transfer a message from one node to another is kept minimal, while also enabling concurrent transactions. Multiple messages can flow through the interconnect network and/or links at any instance time. Each message to be transferred can be broken down into smaller chunks of data structures called packets. In the examples described in this disclosure, each packet may in turn be broken down into message flow control units (flits). A flow control mechanism may decide which message gets to flow and which message is held back.

A "flit" (flow control unit) is a link-level data structure that forms a network packet or stream. For an example of how flits work in a network, an example of how packets are transmitted in terms of flits can be considered. A packet transmitting between A and B may happen in the following steps: A packet transmitting between A and B, for a request that may require more than one flit, may happen in the following steps: The packet will be split into flits C and D; the transmit buffer in A will load the first flit C and send it to B; after B receives C, A moves the C out of the transmit buffer; the transmit buffer in A then loads the next flit D and sends it to B; and at that point both flits that make up the request have been sent to B. B then combines the two flits to generate the packet. Some request or response packets do not require being split into multiple flits. One or more such requests or response messages can be packed into a single flit.

The communication via flits between a host, for example, a central processing unit (CPU) and another device (e.g., a memory device) may be carried out in accordance with a standard protocol. Compute Express Link™ (CXL) is a dynamic multi-protocol technology designed to support accelerators and memory devices. In the CXL protocol, "Compute Express Link Link Layers" (the link layer) is responsible for reliable transmission of transaction layer packets (TLP) across a Flex Bus link. CXL provides a rich set of protocols that include input/output (I/O) semantics similar to Peripheral Component Interconnect Express (PCIe) (i.e., CXL.io), caching protocol semantics (i.e., CXL.cache), and memory access semantics (i.e., CXL.mem) over a discrete or on-package link. CXL.io is required for discovery and enumeration, error report, and host physical address (HPA) lookup. CXL.mem and CXL.cache protocols may be optionally implemented by the particular accelerator or memory device usage model.

As noted above, the flit is a unit amount of data when the message is transmitting at link-level. According to the CXL protocol, a flit can be accepted or rejected at the receiver side based on the flow control protocol and the size of the receiver buffer. The mechanism of link-level flow control allows the receiver to send continuous signals stream to the transmitter to control if it should keep sending flits or stop sending flits. When a packet is transmitted over a link, the packet will often need to be split into multiple flits before the transmitting begins.

For CXL.cache and CXL.mem, layouts, such as, for example, a 528-bit flit layout is specified for CXL2.0 on PCIE Gen 5 and a 256-byte flit layout is specified for CXL 3.0 on PCIE Gen 6. The CXL 2.0 flit layout comprises 4 16-byte slots, and the CXL 3.0 flit layout comprises 16 16-byte slots. CXL 3.0 also provides a 64-byte flit layout. Flit packing rules for selecting transactions from internal queues to fill the available slots (e.g., 4 slots per flit in one example CXL implementation) in the flit are also specified. Other features described for CXL.cache and CXL.mem include a retry mechanism, link layer control flits, CRC calculation, and viral and poison. A key benefit of CXL is that it provides a low-latency, high-bandwidth path for an accelerator to access the system and for the system to access the memory attached to the CXL device.

Flex Bus provides a point-to-point interconnect that can transmit native PCIe protocol or dynamic multi-protocol CXL to provide I/O, caching, and memory protocols over PCIe electricals. The primary link attributes include support of the following features: native PCIe mode, full feature support as defined in the PCIe specification; CXL mode, as defined in this specification; Configuration of PCIe vs CXL protocol mode; Signaling rate of 32 GT/s in PCIE Gen 5 per lane (x8=32 GT/s*8/8=32 GBps per direction, x16=32 GT/s*16/8=64 GBps) or signaling rate of 64 GT/s in PCI Gen 6 per lane (x8=64 GT/s*8/8=64 GBps per direction, x16=64 GT/s*16/8=128 GBps), degraded rate of 16 GT/s or 8 GT/s in CXL mode; Link width support for x16, x8, x4, x2 (degraded mode), and x1 (degraded mode).

The CXL Specification defines some flit packing rules. It is assumed that a given queue has credits towards the receive (RX) portion of the link layer and any protocol dependencies (SNP-GO ordering, for example) have already been considered. Rollover is defined as any time a data transfer needs more than one flit. Example flit packing rules may include that a data chunk which contains 128b (format GO), can only be scheduled in Slots 1, 2, and 3 of a protocol flit since Slot 0 has only 96b available, as 32b are taken up by the flit header. Note that in CXL 2.0 all slots of the flit may carry data (e.g., referred to as a data flit). In CXL 3.0 however, one slot is reserved for header (and one more is used for CRC), and thus CXL 3.0 cannot have all data flits.

The following exemplary rules may apply to Rollover data chunks: If there's a rollover of more than 3 16B data chunks, the next flit must necessarily be an all data flit; If there's a rollover of 3 16B data chunks, Slots 1, Slots 2 and Slots 3 must necessarily contain the 3 rollover data chunks, and Slot 0 will be packed independently (it is allowed for Slot 0 to have the Data Header for the next data transfer); If there's a rollover of 2 16B data chunks, Slots 1 and Slots 2 must necessarily contain the 2 rollover data chunks. Slot 0 and Slot 3 will be packed independently; If there's a rollover of 1 16B data chunk, Slot 1 must necessarily contain the rollover data chunk. Slot 0, Slot 2 and Slot 3 will be packed independently; If there's no rollover, each of the 4 slots will be packed independently.

Memory media (also referred to as "memory media devices") are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. DRAM is organized as an array of storage cells with each cell storing a programmed value. SRAM memory may maintain their programmed states for the duration of the system being powered on. Non-volatile memory cells, for example, NOT AND (NAND) memory cells may maintain their programmed states for extended periods of time even in the absence of an external power source.

Memory media may be coupled to a host (e.g., a host computing device) to store data, commands, and/or instructions for use by the host while the computer or other electronic system is operating. For example, data, commands, and/or instructions can be transferred between the host and the memory device(s) during operation of a computing or other electronic system. A controller, referred to as a "memory controller", may be used to manage the transfer of data, commands, and/or instructions between the host and the memory devices.

Example embodiments are directed to improving bandwidth utilization of interfaces. In some examples, some embodiments are directed to improving bandwidth utilization in CXL-related bidirectional interfaces, such as an interface between a host device and a target.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

FIG. 2 schematically illustrates an example of a mixed traffic stream of read requests and write requests being transmitted over a communication interface without the use of the improvements to bandwidth utilization provided in this disclosure.

DETAILED DESCRIPTION

In example embodiments, the adaptive reordering for efficient flit packaging described herein may be applied to an interface (e.g., communication link) between a host, such as a computer, and an attached memory device. The memory device may include one or more memory controllers that can orchestrate performance of operations to write data to, or read data from, at least one of multiple types of memory devices.

Figure 1:
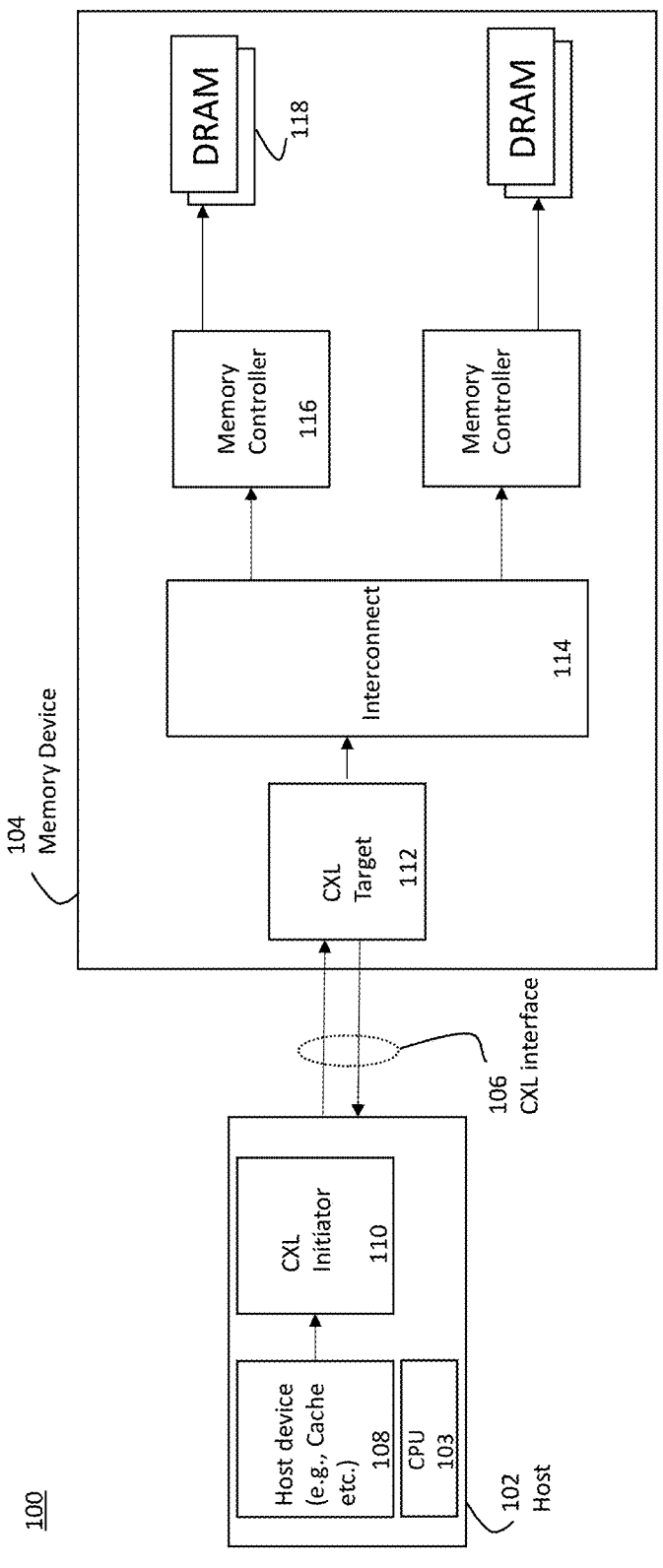
FIG. 1 illustrates an example functional block diagram of a computing system including an interface master device, an interface slave device, and a communication interface connecting the master and slave devices.

FIG. 1 illustrates an example functional block diagram of a computing system 100 that includes an interface master controller (i.e., CXL initiator) 110, an interface slave controller (i.e., CXL target) 112, and a communication (CXL) interface 106 connecting the master and slave devices that are configured to improve bandwidth utilization in accordance with some example embodiments of the present disclosure. According to an embodiment, communication interface 106 is a CXL interface that is configured to connect the CXL master controller 110 and CXL target 112 in accordance with, for example, the CXL 2.0 and/or CXL 3.0 protocol specifications.

Host device 102 may be a computer or the like with one or more processors 103 a CPU, graphics processing unit (GPU), application specific integrated circuit system (ASIC), field programmable gate array (FPGA), or another type of processor). Host device 102 may further include a host component device 108 such as, for example, a cache memory.

Host device 102 may be configured to access a device, such as, for example, a memory device 104. Memory device 104 may include one or more memory media 118 such as dynamic random access memory (DRAM) modules. The memory device 104 may be configured as the "main memory", or some other memory, of the host device 102. Example embodiments are not limited to DRAM, and may, for example, include memory devices 104 that have one or more modules of any one, or a combination, of memory types DRAM and SRAM.

The host device 102 and the memory device 104 communicate via communication interface 106. Communication interface 106 comprises two unidirectional links, one unidirectional link on which the host device 102 transmits messages to the memory device 104 and another unidirectional link on which the memory device 104 transmits messages to the host device 102.

According to some embodiments, communication link 106 is configured to operate in accordance with the CXL standard. When operating as a CXL interface based on PCIe 5.0/6.0, communication link 106 comprises a pair of unidirectional links—each contributing to system bandwidth. CXL2.0 provides an interface which leverages PCIe 5.0 (32 GT/s), and CXL 3.0 leverages PCIe 6.0 (64 GT/s) in each direction (per×8 link). According to some embodiments in which the communication link 106 operates in accordance with CXL, the memory device 104 is a CXL Type 3 device, which means that the interface operates in a master-slave mode in which the CXL master controller 110 in host device 102 operates as master and the CXL target 112 in the memory device 104 operates as slave. In other words, in these particular embodiments in which the memory device is a CXL Type 3 device, all requests (e.g., read requests and write requests) are initiated by the host device 102 and the memory device 104 responds to such requests.

Multiple requests and data are transported over the communication link 106 as fixed width flits. The host device (e.g., CXL Initiator) is responsible for generating requests to the memory device (e.g., CXL device). The memory device has a CXL controller to unpackage the flit requests incoming from the host and forwards the requests to the backend memory media (e.g., DRAM). Each flit in CXL 2.0 is of 528 bits (4 slots each of 16B+2 bytes for CRC=66B or 528 bits). Each flit in CXL 3.0 is of 256B (16 slots each of 16B where 238B in each flit is for TLP Payload and 18B is for CRC and FEC). In some embodiments, in CXL 3.0, 15 out of the 16 slots can be used for multiple requests and data.

In example embodiments, the CXL initiator 110 and CXL target 112 are configured to implement the functionality required by CXL. For example, the CXL initiator 110 and CXL target 112 operate to package messages or TLP into flits for transmission over communication link 106, and to unpack flits received over the communication link 106 to obtain the transmitted messages.

As noted above, in some embodiments, the memory device 104 is a CXL compliant memory system (e.g., the memory system can include a PCIe/CXL interface). CXL is a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When memory device 104 is CXL compliant, the interface management circuitry in the CXL target 112 (including data link and transaction control) may use CXL protocols to manage the communication link 106 which may comprise PCIe PHY interfaces.

According to some embodiments, the memory media 118 includes one or more DRAM devices. In some embodiments, the main memory for computer system 100 is stored in DRAM cells that have high storage density. DRAM cells lose their state over time. That is, the DRAM cells must be refreshed periodically, hence the name Dynamic. DRAM can be described as being organized according to a hierarchy of storage organization comprising dual in-line memory modules (DIMMs), rank, bank, and array. A DIMM comprises a plurality of DRAM chips, and the plurality of chips in a DIMM are organized into one or more "ranks." Each chip is formed of a plurality of "banks." A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64B request). Each array provides a single bit to the output pin in a cycle (for high density and because there are few pins). DRAM chips are often described as xN, where N refers to the number of output pins; one rank may be composed of eight x8 DRAM chips (e.g., the data bus is 64 bits). Banks and ranks offer memory parallelism, and the memory device 104 may schedule memory accesses to maximize row buffer hit rates and bank/rank parallelism.

In some embodiments, the memory media 118 is low power double data rate (LPDDR) LP5 or other similar memory interfaces. However, embodiments are not limited thereto, and memory media 118 may comprise one or more memory media of any memory media types, such as, but not limited to, types of DRAM.

Each of the plurality of media controllers 116 can receive the same command (e.g., command to read or write memory media 118) and address and drive the plurality of channels connecting to the memory media substantially simultaneously. By using the same command and address for the plurality of media controllers, each of the plurality of media controllers 116 can utilize the plurality of channels to perform the same memory operation on the same plurality memory cells. Each media controller 118 can correspond to a redundant array of independent disks (RAID) component.

As used herein, the term "substantially" intends that the characteristic need not be absolute but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, multiple memory controllers can be utilized such that they are writing data to the memory devices at the same time, regardless of whether one of the media controllers commences or terminates prior to the other.

A front-end portion of memory device 104 includes the CXL target 112 and an interconnect 114 (e.g., CXL interconnect) to couple the one or more media controllers 116 to the host device 102 through one or more I/O lanes of link 106. The communications over I/O lanes may be according to a protocol such as, for example, PCIe. In some embodiments, the plurality of I/O lanes can be configured as a single port. Example embodiments may not be limited by the number of I/O lanes, whether the I/O lanes belong to a single port, or the communication protocol for communicating with the host.

Communication link 106 receives data and/or commands from host device CXL initiator 110 through one or more I/O lanes. In an embodiment, communication link 106 is a physical (PHY) interface configured for PCIe communications. The host CXL initiator 110 and the memory device CXL target at 112 include interface management circuitry (including data link and transaction control) which provides higher layer protocol support for communications with each other through the type of PHY interface in the communication link 106.

Memory device 104 includes memory media controllers 116 and other circuitry to control, in response to receiving a request or command from host device 102, performance of a memory operation. The memory operation can be a memory operation to read data from, or write data to, memory media 118.

Memory device 104 may also comprise a security component configured to encrypt the data before storing, and to decrypt data after reading the data in memory media 118. In some embodiments, memory device 104 may also include a cache memory to store data associated with the performance of the memory operations.

In some embodiments, in response to receiving a request from host device 102, data read from or written to memory media 118 can be stored in cache lines of a cache memory on the memory device 102. The data in the cache memory can be written to memory media 118. In some embodiments, an error correction component on the memory device is configured to provide error correction to data read from and/or written to memory media 118. In some embodiments, the data can be encrypted using an encryption protocol such as, for example, Advanced Encryption Standard (AES) encryption, before the data is stored in the cache memory.

A management unit located in the memory device 104 may be configured to control operations of the memory device 104. The management unit may recognize commands from the host device 102 and accordingly manage the one or more memory media 118. In some embodiments, the management unit includes an I/O bus to manage out-of-band data, a management unit controller to execute a firmware whose functionalities include, but not limited to, monitoring and configuring the characteristics of the memory device 104, and a management unit memory to store data associated with memory device 104 functionalities. The management unit controller may also execute instructions associated with initializing and configuring the characteristics of memory device 104.

A backend portion of memory device 104 is configured to couple to one or more types of memory media (e.g., DRAM media 118) via (e.g., through) a plurality of channels, which can be used to read/write data to/from the memory media 118, to transmit commands to memory media 118, to receive status and statistics from memory media 118, etc. The management unit can couple, by initializing and/or configuring the memory device 104 and/or the memory media 118 accordingly, the memory device 104 to external circuitry or an external device, such as host device 102 that can generate requests to read or write data to and/or from the memory media. The management unit is configured to recognize received commands from the host device 102 and to execute instructions to apply a particular operation code associated with received host commands for each of a plurality of channels coupled to the memory media 118.

The backend portion includes a media controller portion comprising one or more media controllers 116 and a physical (PHY) layer portion comprising a plurality of PHY interfaces connecting the media controllers to the memory media. In some embodiments, the backend portion is configured to couple the PHY interfaces to a plurality of memory ranks of the memory media 118. Memory ranks can be connected to the memory controller(s) 116 via a plurality of channels. A respective media controller 116 and a corresponding PHY interface may drive a channel to a memory rank. In some embodiments, each media controller 116 can execute commands independent of the other media controllers 116. Therefore, data can be transferred from one PHY interface through a channel to memory media 118 independent of other PHY interfaces and channels.

Each PHY interface may operate in accordance with the PHY layer that couples the memory device 104 to one or more memory ranks in the memory media 118. As used herein, the term "PHY layer" generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels.

As used herein, the term "memory ranks" generally refers to a plurality of memory chips (e.g., DRAM memory chips) that can be accessed simultaneously. In some embodiments, a memory rank can be sixty-four (64) bits wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller may include a channel control circuitry and a plurality of bank control circuitry where a respective one of the plurality of bank control circuitry is configured to access a respective bank of the plurality of banks on the media device 118 accessed by the respective media controller 116.

Rank, channel, and bank can be considered hardware-dependent logical groupings of storage locations in the media device. The mapping of rank, channel and bank logical groupings to physical storage locations or rows in the memory media device may be preconfigured, or may be configurable, in some embodiments by the memory controller in communication with the memory media 118.

In streaming reads or writes traffic but overall mixed traffic, if the disclosed embodiments are not being used, only 1 side of the CXL link will be used for data payload. CXL initiator controller sending write data to CXL target controller or CXL target controller responding with read data to CXL initiator controller. Thus, when disclosed embodiments are not used, since CXL maximum throughput is stated based on data payload moving in both directions the resulting bandwidth utilization, or throughput, is substantially (e.g., about 50%) less than the maximum possible bandwidth. For example, for x8 Link PCIe 6.0, has 64 GBps in each direction (total 128 GBps both directions combined). But streaming data allows use of only 1 side of the link at a time reducing payload bandwidth to a maximum of 64 GBps. An example of such a scenario occurs with cache flush on host device 102 of dirty cache lines that is required to be written to the memory media 118 on the memory device 104.

In mixed traffic, when there are more writes than reads in the CXL controller queue (e.g., input buffer 302), 3 back-to-back writes can consume the entire flit with no space left for accommodating reads in the outgoing flit. In addition to the reduced bandwidth utilization this also results in an increased latency for reads. For example, read requests get delayed in the system if the first in first out (FIFO) algorithm is used for packaging of the flit assuming there are 3 writes followed by a read.

Example embodiments provide for improving the bandwidth utilization on communication link 106 by reordering messages so that both unidirectional links that make up the communication link are utilized. In effect, whereas certain sequences of messages being transmitted downstream from the host device to the memory device, if transmitted in the same order as they are received in the host device's transmission buffer, can result in relatively long periods of time during which only the downstream link is being significantly utilized. For example, when long sequences of consecutive write requests, such as that might result in flushing a cache from the host device to the memory device, occurs, the downstream link may be utilized at near 100% of its bandwidth while the upstream link is only utilized for acknowledgments that consume a minimal portion of the available bandwidth.

Figure 2:
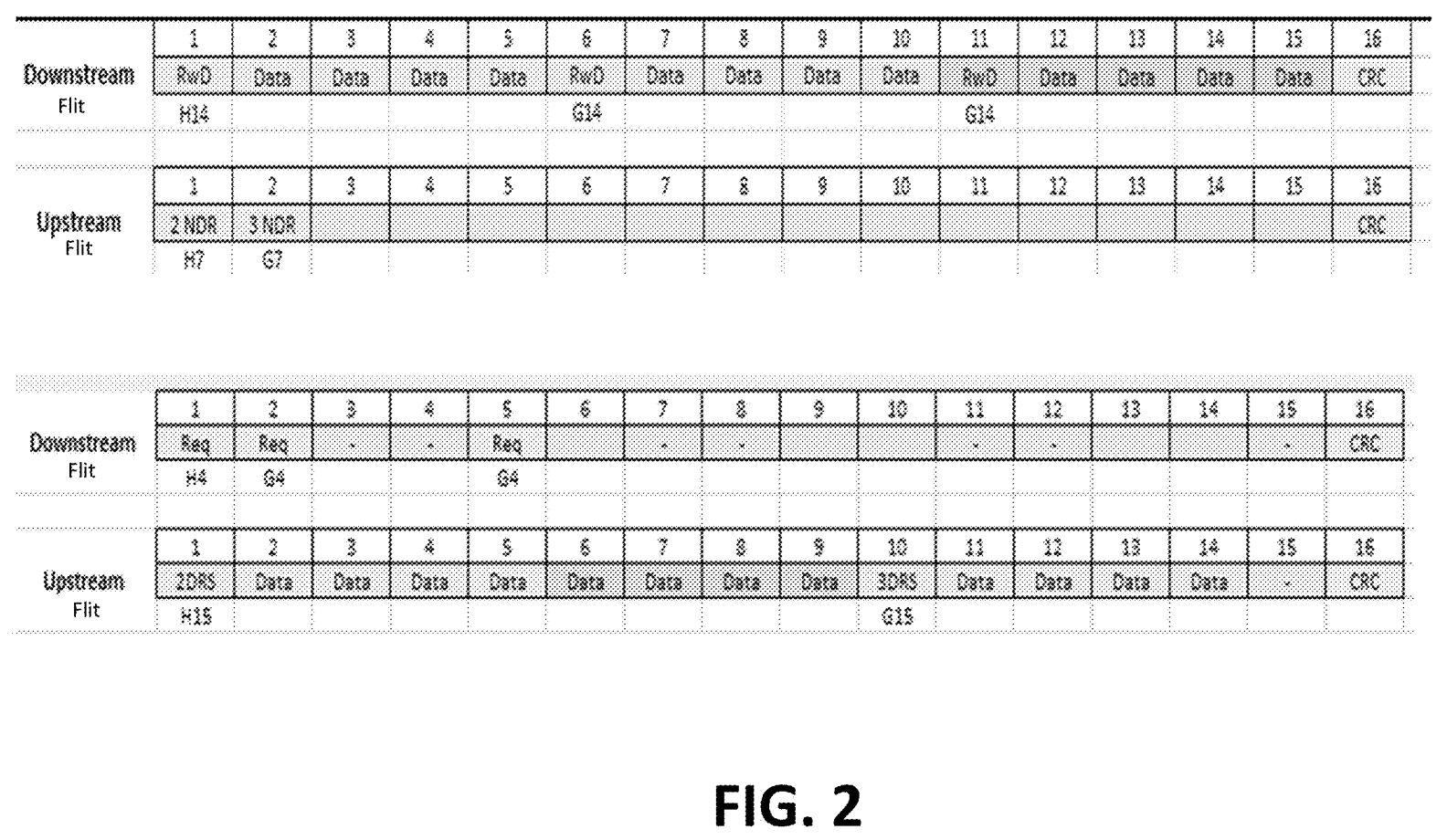

Assuming the traffic pattern in an example CXL controller input queue (e.g., x8 PCIe Gen 6) such as input buffer 302 is, WR WR WR RD RD RD with FIFO algorithm, FIG. 2 shows how the flit packaging would look like. FIG. 2 schematically illustrates an example of a mixed traffic stream of read requests and write requests being transmitted over a communication interface without the use of the improvements to bandwidth utilization provided in this disclosure.

In FIG. 2, two flits are schematically illustrated for each direction-downstream from host device to memory device and upstream from memory device to host device. In the illustrated scenario, each flit has 16 slots of which a maximum of 15 can be used for request, with one slot being reserved for error checking (CRC).

The host has a mixed traffic stream of messages comprising, as described above, three write requests followed by three read requests to be transmitted downstream, with the write requests preceding the read requests in the transmission ordering. Each write request occupies one slot for the command and four slots for the data to be written to memory media. Therefore, the first downstream flit can only accommodate the three write requests as shown. The second downstream flit carries the three read requests. Since read requests do not carry data, each consumes only a single slot in the flit.

The first upstream flit carries acknowledgments for the three write requests. The write acknowledgements each occupies only a single slot in the upstream flit. The second upstream flit carries responses to the read request. Each read response includes a portion of the data being returned and thus occupies multiple slots in the flit. For example, in the illustrated embodiment, each read response returns an amount of data that occupies four slots in the upstream flit.

As can be seen, when, in the downstream direction, the three write requests are transmitted consecutively, and then followed by the three read requests, during the transmission of the first downstream flit, the upstream flit has most of its slots unoccupied. Therefore, although the bandwidth of the unidirectional downstream link of the bidirectional communication link is fully (or substantially fully) utilized, the opposite unidirectional link is empty except for the flit slots occupied by the single-slot write acknowledgments.

Thus, when considering the bandwidth utilization of system 100, since the bandwidth advertised is often considered the sum bandwidth of both unidirectional links, the bandwidth utilization may often be about 50% during the first downstream flit and the first upstream flit. During the second downstream flit and the second upstream flit (which carries the response data), the downstream direction is empty except for the respective single slot occupied by each read request. But the upstream direction is fully (or substantially fully) utilized. Thus, for the time interval corresponding to the second downstream flit and the second upstream flit too the bandwidth utilization may be about 50%.

Bandwidth of such packaging shown in FIG. 2 is about 48 GBps for x8 (max throughput=128 GBps), and the latency impact is greater than 4 ns (since each flit consumes 4 ns of transfer time for CXL 3.0 x8 PCIe Gen 6 Interface). Power consumption is also higher since the writes are posted whereas read responses take more time to come back from backend media so the link must remain active for a longer time.

Thus, as, for example, described above in relation to FIG. 2 in scenarios that use conventional packaging, streaming reads or writes mixed traffic can reduce total payload bandwidth of a CXL interface by using only 1 direction of the bidirectional CXL link at a time, thereby increasing latency of read responses and possibly increasing power consumption due to the link being required to stay active for more time.

Some Example embodiments are directed to improving the bandwidth utilization in application scenarios such as that described above. Example embodiments provide packaging systems and techniques that overcome the above identified deficiencies of the conventional packaging of flits. For streaming reads and writes mixed traffic in the input queue of the CXL initiator controller (e.g., controller 302), the requests are reordered within a shrinkable or expanding reordering window to mix the requests in, for example, a 2Read1Write ratio or 2Write1Read Ratio every 3 requests in the reordering window such that both sides of the CXL link (e.g. both unidirectional links 312 and 314 of the bidirectional CXL interface 106 can be used for payload bandwidth, improve latency of read requests by reordering the reads in the input queue when there are multiple writes ahead of the reads and help in earlier execution of workloads. The reordering window can be small to avoid increased delay in searching for requests to be reordered while a larger reordering window will allow for more requests to be reordered for creating a better mix of traffic.

Embodiments of this disclosure can, given the same sequence of mixed traffic of read requests and write requests as that shown in FIG. 2, can perform the communication between the host device and the memory device with substantially improved bandwidth utilization of the communication link that connects the host device and memory device. The improved bandwidth utilization also facilitates reduced read latencies. An example comparison scenario is described in relation to FIG. 5A and FIG. 5B below.

Figure 3:
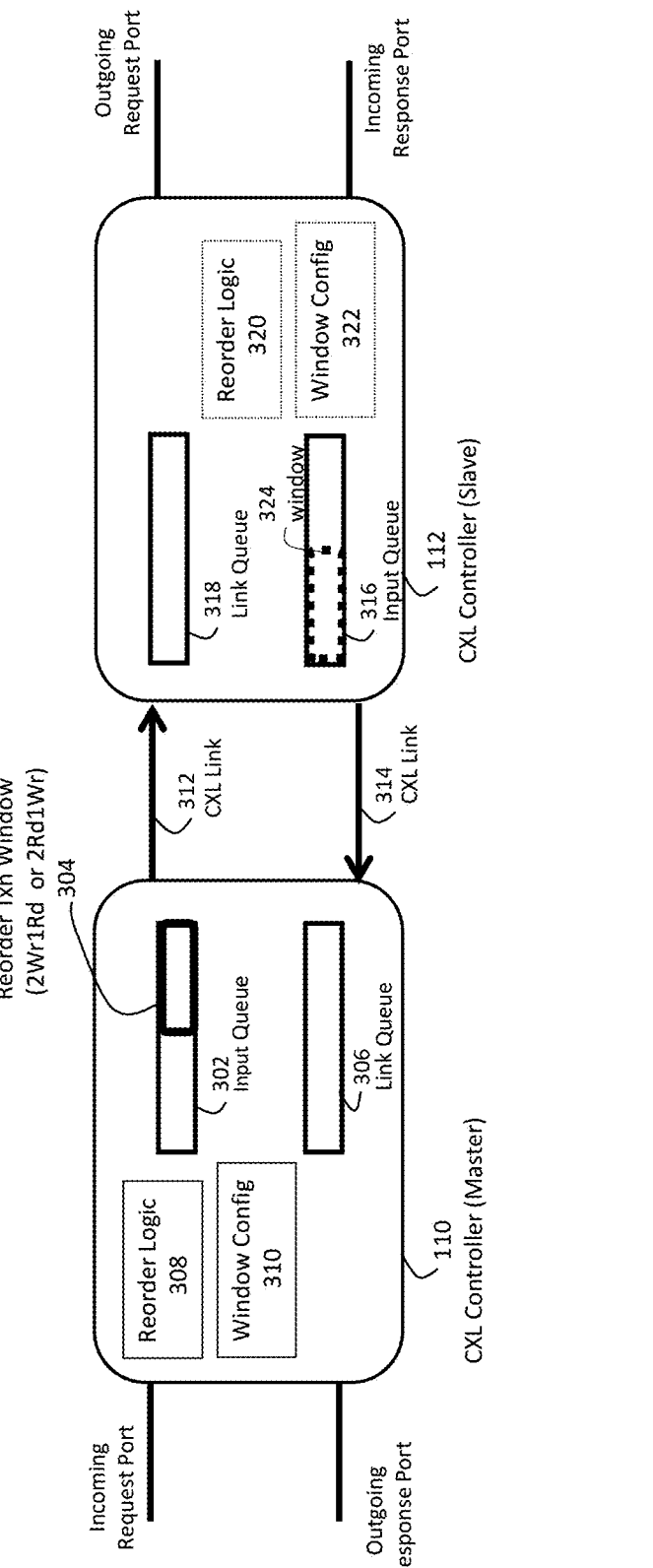
FIG. 3 schematically illustrates some of the components of the interface master device and the interface slave device, in accordance with some embodiments.

FIG. 3 schematically illustrates some components of an interface master device and an interface slave device associated with a communication link such as communication link 106 shown in FIG. 1, in accordance with some embodiments. In accordance with some embodiments, the interface master device and the interface slave device are CXL protocol controllers such that the interface master device may correspond to the CXL initiator 110, and the interface slave device may correspond to the CXL target 112.

The interface master device and the interface slave device each is configured with a respective input buffer (e.g., input queue) in which to queue the messages to be transmitted over communication link 106 and a link buffer in which to temporarily buffer messages received over the communication link 106. More specifically, input buffer 302 of the CXL initiator 110 temporarily buffers read request messages and write request messages to be transmitted downstream from the CXL initiator 110 to the CXL target 112 over the downstream unidirectional link 312, and input buffer 316 of the CXL target 112 (slave) temporarily buffers read response messages and write response messages to be transmitted upstream from the CXL target 112 to the CXL initiator 110 over the upstream unidirectional link 314. It is noted that read response messages may be associated with data being returned, while there is no data being returned with write response messages.

The CXL initiator controller 310 additionally includes a reorder transmission window 304 on the input buffer 302, reorder logic module 308, and a reorder configuration 310. The reorder transmission window 304 specifies a range of messages in the input buffer that is searched to determine the messages that are to populate the next flit. In some embodiments, the messages with which the next flit is packaged are obtained in sequence from the top of the reorder transmission window, where the top of the reorder transmission window is also the top of the input buffer.

The reorder transmission window 304 can be expanded or contracted in size, and its current size can be stored in reorder configuration 310 which may, in some embodiments, be a register. Reconfiguration of the size of the window can be performed upon a system restart, or soft reboot. In some embodiments, the window can be dynamically reconfigured while the system is operational. For example, in some embodiments, based on an observation of the order in which messages arrive at the input buffer 302 (e.g., number of consecutive write requests that arrive in the buffer in a sequence) the size of the reorder transmission window can be adjusted so as to increase the likelihood that the search window includes different types of messages (e.g., write requests and read requests) while also not unnecessarily increasing the search costs by enlarging the window too much.

For example, when it is determined by the reorder logic module 308 that most of write requests arrive in sequences of no more than 4 consecutive write requests, a window size of 5 or 6 may be considered optimal, and when it is determined by the reorder logic module 308 that most of write requests arrive in sequences of no more than 6 consecutive write requests, a window size of 7 or 8 may be considered optimal. The ability to dynamically reconfigure the size of the reordering window yields a system that can adapt to different traffic mixes in order to improve bandwidth utilization.

In some embodiments, such as in embodiments in which both the CXL initiator 110 and the CXL target 112 can initiate write/read requests or other such requests from the other. Both the CXL initiator 110 and the CXL target 112 may have a reorder transmission window configured on its input buffer to reorder messages to be transmitted on the link. In such embodiments, the CXL initiator 110 and the CXL target 112 initiators may include reorder logic modules and configuration registers. For example, in such embodiments, in addition to the reorder transmission window 304, reorder logic 308, and reorder configuration 310 of the CXL initiator 110, the CXL target 112 on device 104 may also have a reorder transmission window 324, reorder logic 320, and reorder configuration 322 that operate similarly to the reorder transmission window 304, reorder logic 308, and reorder configuration 310 but for packaging flits in the direction from the device to the host.

Figure 4:
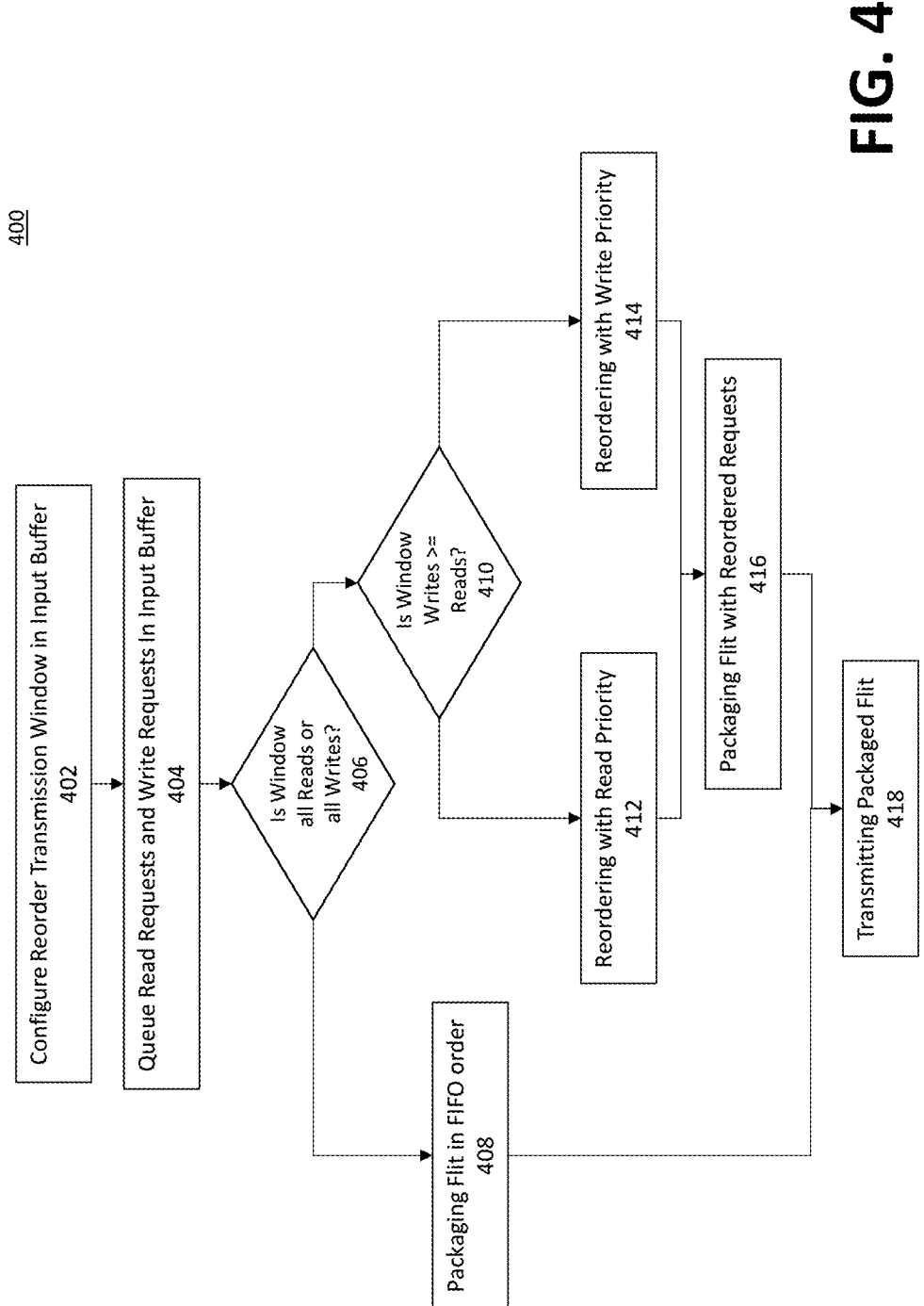
FIG. 4 is a flowchart of a process of improving bandwidth utilization in the system shown in FIG. 1, in accordance with some example embodiments.

FIG. 4 is a flowchart of a process 400 for improving bandwidth utilization in the system shown in FIG. 1, in accordance with some example embodiments.

In some embodiments, process 400 commences at a system reboot when, at operation 402, the reorder transmission window 304 in the CXL initiator 110 is configured. The retransmission window 304 may be configured in accordance with the window size specified in a retransmission configuration register 310. The setting of the size of the reordering transmit window can be performed. The reordering window can be set to less than the size of the input queue on the CXL Controller. Care must be taken to make the window too large (involves search penalty) or too small (not enough requests to reorder).

At operation 404, incoming read request messages and write request messages are temporarily stored in the input buffer 302. The buffering may be in accordance with the order of arrival.

At operation 406, it is determined whether there is a possibility of reordering. For example, at operation 406 it is determined whether all the messages within the window are either all reads or all writes. If all messages within the window are of one message type (e.g., either all read requests or all write requests), then there can be no reordering. Therefore, at operation 408, the flit is packaged with the messages at the top of the window in sequence in FIFO order and at operation 418 the packed flit is transmitted over the bidirectional CXL interface 106 from the host 102 to device 104. Stated in another manner, if the write traffic ratio is 1.0 (read traffic ratio=0.0) or write traffic ratio is 0.0 (read traffic ratio=1.0) in the reordering window, signifies all RD/WR in window so nothing to reorder.

If, at operation 406, it is determined that not all messages in the window are of the same message type, then it is determined whether one or the other type of message is in excess so that one direction of the bidirectional communication link may be underutilized. Thus, at operation 410 it is determined whether, within the reorder transmission window, write requests are greater than or equal to read requests. In some embodiments, this can be determined by keeping a count of each type of message within the window. In some other embodiments, a ratio of the write messages and/or a ratio of the read messages are determined. For example, a write-to-read ratio, write-to-all messages in window, or read-to-all messages in window can be determined.

When it is determined at operation 410 that the write messages are greater than or equal to read messages within the window, then at operation 412, reordering of some messages within the window is performed with read priority (read priority reordering). In one embodiment, the read message (e.g., the first read message in the arrival order) is located in the reorder transmission window and is identified and inserted at the top of the window. Locating the read at the top of the window (and thus ensuring that it is packed into the flit at the first available slot) provides for reducing the latencies for read operations.

On the other hand, if it is determined at operation 410 that the read messages are greater than write messages, then at operation 414 reordering of some messages within the window is performed with write priority (write priority reordering). For example, a write message (e.g., the first write message in the arrival order) is located and inserted at a predetermined index. The predetermined index may depend on the number of messages that can be packed into the flit. In one embodiment, the write message can be inserted at the third position. For example, CXL flit packing rules require that no more than two consecutive read messages can be packaged. Thus, the write message can be inserted into the flit at the empty slot after the first two read messages.

It is determined whether one or more predetermined message patterns exist within the reordering window 304. For example, depending on the size of the flit and/or the number of requests of a particular type that can be accommodated in a single flit, a pattern to be detected may be determined. When the flit includes 15 slots available for requests and each request requires 4 slots for the associated data, a pattern to be detected may be a sequence of 3 consecutive requests of the same type.

After either operation 412 or 414, at operation 416, the flit is packaged with the reordered messages. The packaging may be performed in accordance with rules specified for a standard protocol for the communication interface 106, such as, for example, the CXL protocol. Example rules for CXL include not allowing more than two consecutive read requests, etc.

At operation 418, the packaged flit is transmitted. Transmission of the flits can be by any technique for transmitting flits.

The above-described process 400 rearranges the messages to be transmitted where possible to reduce or eliminate flits that result in only one of the unidirectional links of a bidirectional link being substantially utilized while the other is only sparsely utilized.

Process 400 is described above with respect to the master-slave configuration of CXL controllers shown in FIG. 3, where all the requests were initiated at the host 102 and the memory device 104 merely responded to the requests. In such embodiments, the reorder transmission window, reorder logic and reorder configuration may be implemented only on the host-side. In some other embodiments, when the device-side too can initiate requests, then the device may also implement a reorder transmission window, reorder logic and reorder configuration that may operate in a similar manner to the corresponding components on the host-side to package flits heading in the direction from the device to host.

Figure 5A:
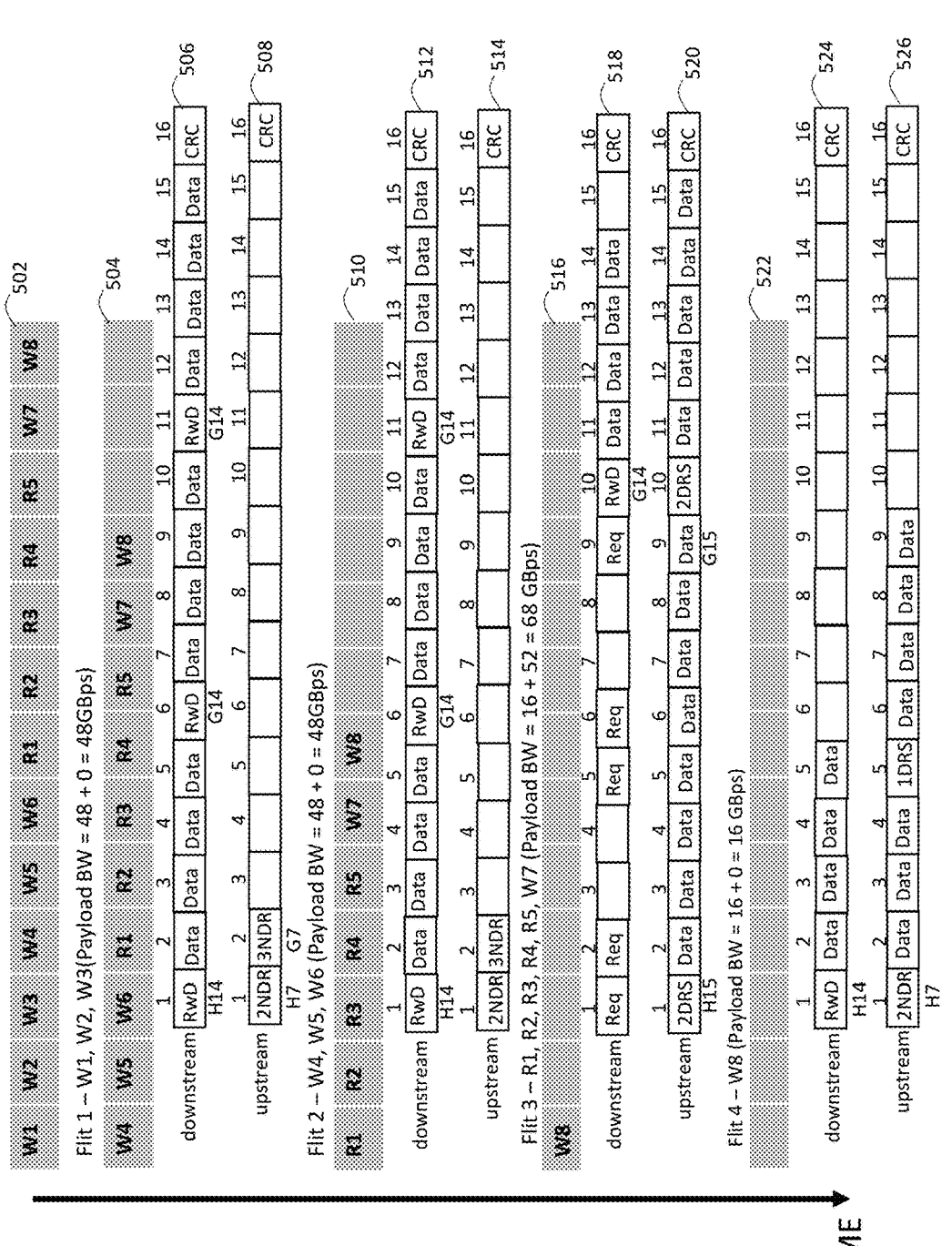
FIG. 5A and FIG. 5B schematically illustrate an example of a mixed traffic stream with and without the improved bandwidth utilization provided by example embodiments.
Figure 5B:
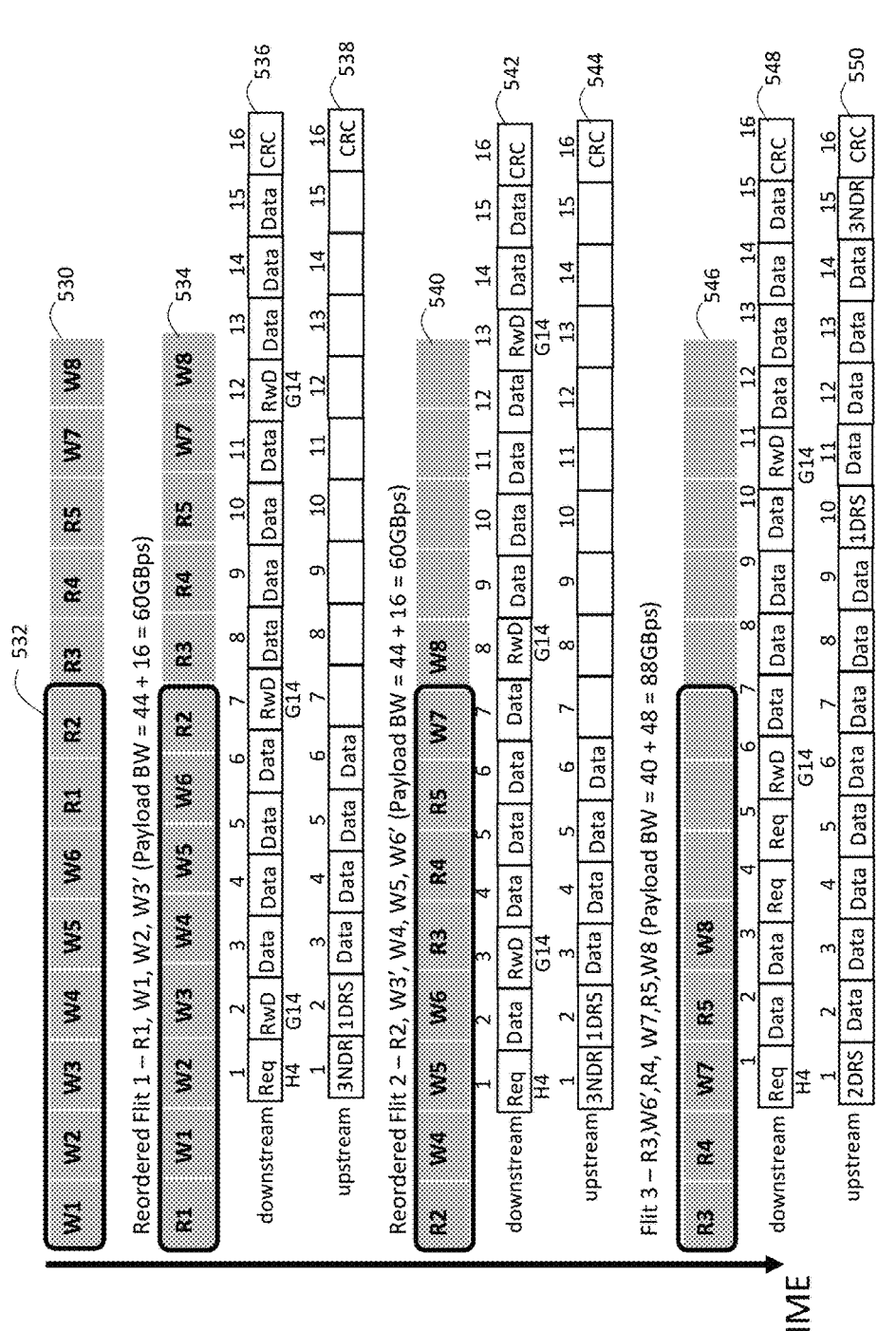

FIG. 5A and FIG. 5B schematically illustrate an example of a mixed traffic stream with and without the improved bandwidth utilization provided by example embodiments, respectively.

FIG. 5A illustrates the process of transmitting downstream flits 1-4 without the reordering and packaging of example embodiments. The buffer ordering 502 shows the requests in the original order of arrival at the input buffer of the host device. If there is no reordering to be implemented, then the requests will be packaged into flits strictly in the FIFO order reflecting the order of arrival in the input buffer.

Flit 1, in keeping with the message order shown in 502, is packaged with write requests W1, W2 and W3. 504 shows the input buffer after flit 1 has been packaged, and thus W1-W3 having been removed from the input buffer. 506 shows the packaged flit 1, and 508 shows the upstream flit received in response to the flit 1. Note that although these examples show the upstream response flit as immediately following the corresponding downstream flit, it should be understood that the response flit may be received after some time/delay after the corresponding downstream flit.

Flit 1 packages the three write requests W1, W2 and W3. W1 is packaged starting at slot 1 with header information (e.g., specified as a H14 header in CXL), and its data in slots 2-5. W2 is packaged starting at slot 6 with header information (e.g., specified as a G14 header in CXL), and its data in slots 7-10. W3 is packaged starting at slot 11 with header information (e.g., specified as a G14 header in CXL), and its data in slots 12-15. The 16th slot is reserved for CRC.

When flit 1 is packaged with W1-W3, 504 shows that the next message in the input buffer (e.g., the next message at the top of the input buffer) to be packaged is W4.

The response flit 508 includes the acknowledgments for the W1-W3 write requests. The acknowledgments for write requests typically do not include data. As shown a "2NDR" acknowledgment is returned followed in the same flit with a "3NDR" acknowledgment. The 2NDR and 3NDR acknowledgments and their arrangement is CXL protocol specific, and embodiments are not limited thereto.

Flit 2 is packaged in the original order in the input buffer to include write requests W4-W6. 510 shows the input buffer after flit 2 has been packaged, and thus W4-W6 having been removed from the input buffer. 512 shows the packaged flit 2, and 514 shows the upstream flit received in response to the flit 2.

Flit 2 packages the three write requests W4, W5 and W6. W4 is packaged starting at slot 1 with header information (e.g., specified as a H14 header in CXL), and its data in slots 2-5. W5 is packaged starting at slot 6 with header information (e.g., specified as a G14 header in CXL), and its data in slots 7-10. W6 is packaged starting at slot 11 with header information (e.g., specified as a G14 header in CXL), and its data in slots 12-15. The 16th slot is reserved for CRC.

When flit 2 is packaged with W4-W6, 510 shows that the next message in the input buffer to be packaged is R1.

The response flit 514 includes the acknowledgments for the W4-W6 write requests. The acknowledgments for write requests typically do not include data. As shown a "2NDR" acknowledgment is returned followed in the sane flit with a "3NDR" acknowledgment. The 2NDR and 3NDR acknowledgments and their arrangement is CXL protocol specific, and embodiments are not limited thereto.

Flit 3 is packaged with the messages next in line in the input buffer. Accordingly, read requests R1-R5 and write request W7 are packaged in flit 3. 516 shows the input buffer after flit 3 has been packaged, and thus R1-R5 and W7 having been removed. 518 shows the packaged flit 3, and 520 shows the upstream flit received in response to the flit 3.

Flit 3 packages the five read requests R1-R5 and one write request W7. Each read request consumes only a single slot (since no data is being carried), and thus R1-R5 consumes only five of the 15 slots available for requests. In the illustrated protocol implementation, it is required by the protocol that two slots are left unoccupied after each pair of read requests in the flit. Thus, slots 1-9 are consumed due to the read requests R1-R5. W7 is packaged starting at slot 10 with header information (e.g., specified as a G14 header in CXL), and its data in slots 11-14. Slot 15 is empty because the remaining space in that flit, the single slot 15, is insufficient for the next request W8 in the input buffer. The 16th slot is reserved for CRC.

When flit 3 is packaged with R1-R5 and W7, 516 shows that the next message in the input buffer to be packaged is W8. W8 is the only remaining message in the input buffer.

The response flit 520 includes as much of the data requested by the read requests R1-R5 as can be accommodated in the response flit 520. The remaining requested data and the acknowledgments for the write request W7 can be in a subsequent flit (e.g., an upstream flit immediately following response flit 520). The responses to the read requests R1-R2 are indicated by the "2DRS" (header H15) in slot 1 and the 8 slots of data in slots 2-9. The responses to the read requests R3-R4 are indicated by the "2DRS" (header G15) in slot 10 and the 5 remaining slots of data in flit 3. The remaining data in response to R4 are packed into the next upstream flit (e.g., flit 526) in slots 2-4. The response data for R5 may begin at slot 5 in flit 526 and occupy slots 6-9. The acknowledgments for write request W7 may be included as a 1NDR in slot 9 of flit 526.

Downstream flit 4 is packaged to include the only request remaining in the input buffer. Thus flit 4, as seen in 524, includes W8 starting at slot 1 with its data in slots 2-5. There being no further requests pending in the input buffer, the remainder of flit 4 may remain unoccupied. After W8 is packaged, the input buffer, as seen in 522, is empty.

The upstream flit 526, in addition to the responses that could not be accommodated in upstream slit 520, also includes the 2NDR in response to W8 included in downstream flit 4. The 2NDR also acknowledges the W7 for which the acknowledgement was not included in the previous upstream flit.

FIG. 5B illustrates in input buffer 530, the same input buffer content as shown in input buffer 502. FIG. 5B illustrates the scenario in which this same buffer of requests is transmitted in accordance with an example embodiment.

The reordering window 532 is shown imposed on the input buffer 530 and extends over 8 requests. This means that, when it is determined that it is desirable to reorder the messages to be included in the next flit, a window of 8 messages starting from the very first message in the input buffer can be evaluated to identify a message to be inserted into the sequence.

In example embodiments, packing the flits is performed for messages starting at the top of the reorder transmission window, which is also the top of the input buffer. Before downstream flit 1 is packaged, the CXL initiator controller may detect that the window comprises more write requests than read requests (see operations 410 and 412 in FIG. 4). Therefore, the CXL initiator controller identifies a read request (R1), which is the first read request in the window 532, from within window 532 and inserts it in the first position in the input buffer, pushing down the original messages by 1. The input buffer 530, after being reordered to include R1 in the first position, is shown in 534.

The reordered buffer 534 is used to pack downstream flit 1, shown as 536. Flit 1 includes the read request R1 in slot 1, and W1-W3 in the remaining slots. W1 occupies slots 2-6, W2 occupies slots 7-11, and W3 starts at slot 12 and occupies the remaining slots 13-15, which leaves one more data slot of W3 to be carried in a subsequent flit. The read request is moved to the first slot, before the write requests to ensure read priority. This helps reduce read latency. Reordering in this manner is referred to as read priority reordering.

The upstream flit 538 carries the acknowledgment 3NDR for W1-W3 in slot 1 and the response to the read request R1 in slots 2-6.

After flit 1 is packaged, and thus after R1 and W1-W3 are removed from the input buffer, the next messages available for packaging would be W4-W6. However, if this sequence were packaged in flit 2, flit 2 would be consumed entirely by write requests and thus would result in low bandwidth utilization in the upstream response flit. In example embodiments, the CXL initiator controller evaluates the window 532 and determines that the window has a same number of write requests and read requests. Accordingly, the CXL initiator controller performs read priority reordering by moving the next read request to the first slot of the sequence of messages to be packed into the next flit (e.g., flit 2). This is shown in 540.

Flit 2 is shown in 542. R2 is inserted in slot 1. The overflow data of W3 from flit 1 (i.e., a single data slot) is included in slot 2. W4 and W5 are included in slots 3-7 and 8-12 respectively. W6 beings at slot 13, but two of its data slots will have to be carried in the next downstream flit.

The upstream response flit 544 includes the acknowledgment in slot 1 to write requests W4-W6, and the response to R2 in slots 2-6.

After flit 2 is packed, and thus after R2 and W4-W6 are removed from the input buffer, the next messages available for packing flit 3 with would be R3-R5 followed by W7 and W8. The CXL initiator controller determines that the window has more read requests than write requests and determines to do write priority reordering (see operations 410 and 414). Accordingly, reordering is performed as shown in 546 to insert W7 after R1 and R2 but before R5. In this embodiment, W7 is inserted at the third slot to improve slot occupancy because CXL packing rules do not allow more than two consecutive read requests. However, embodiments are not limited to reordering write requests to positions to which read requests are not permitted in accordance with CXL packing rules.

In this manner, flit 3 is packed to include read requests R3, R4 and R5 and write requests W7 and W8. Flit 3 must also include the two data slots remaining from flit 2 for W6. The rearrangement allows all three of the read requests and the two write requests to be included in flit 3. As can be seen, the read request R3 is in slot 1 because in some CXL embodiments, slot 1 cannot be data. After R3 in slot 1, the overflow data of W6 from flit 2 may be in slots 2-3. After the overflow from the previous flit is accommodated in the current flit, the remaining requests in the window can be packed. In accordance with the write priority rules, W7 can be written to the slot immediately following R4 and R5. W8 follows W7.

The upstream response flit 550 includes the data in response to reads R3-R5 and the acknowledgments for writes W7-W8.

It can be seen when comparing FIG. 5A and FIG. 5B that for the same input buffer content, the example embodiment shown in FIG. 5B resulted in less flits being transmitted than in the scenario of FIG. 5A. This translates into better read latency, improved bandwidth utilization, and lower power consumption.

The scenarios are illustrated in FIGS. 5A-5B assume CXL 3.0 format of flits, but embodiments are not limited thereto. Other CXL protocol formats of flits may be accommodated in some example embodiments.

The inventors estimate that the scenario shown in FIG. 5A results in average payload bandwidth about 45 GBps, while the scenario shown in FIG. 5B has an average payload bandwidth of 69.33 GBps.

Example embodiments were described above primarily in relation to the CXL 2.0 and/or 3.0 specifications. Moreover, some of the described embodiments described a CXL Type 3 memory device communicating with a host. It will, however, be understood that embodiments are not limited to the CXL or the CXL versions that are specifically mentioned here. Moreover, example embodiments may be applicable to devices other than memory devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system comprising:
   a host comprising a first buffer of messages and a first protocol controller;
   a device comprising a second protocol controller;
   a bidirectional communication interface between the host and the device, wherein the first protocol controller and the second protocol controller are configured to communicate over the bidirectional communication interface;
   wherein the first protocol controller is configured to perform operations comprising:
      configuring a reordering window over a subset of messages in the first buffer that are pending for transmission from the host to the device;
      comparing a number of messages of a first type and a number of messages of a second type that are present within the reordering window;
      based on the comparing, selecting a message of the first type or the second type from within the reordering window and reordering a plurality of messages, including the selected message, in the first buffer to balance utilization of both unidirectional links of the bidirectional communication interface;
      packing the reordered plurality of messages into a data transmission structure for transmission from the host to the device; and
      transmitting the packed data transmission structure over the bidirectional communication interface to the device.

2. The system according to claim 1, wherein the messages of the first type are messages for which in response no data is transmitted from the device to the host and the messages of the second type are messages for which in response data is transmitted from the device to the host.

3. The system according to claim 1, wherein the messages of the first type are write request messages and the messages of the second type are read request messages.

4. The system according to claim 3, wherein the bidirectional communication interface is a CXL interface comprising a first unidirectional communication link from the host to the device and a second unidirectional communication link from the device to the host, and wherein the messages of the first type and the messages of the second type are transmitted on the first unidirectional communication link and the second unidirectional communication link by packing into the data transmission units which are fixed size flow control units (flits) such that host-to-device request flits are carried on the first unidirectional communication link and device-to-host response flits are carried on the second unidirectional communication link.

5. The system according to claim 4, wherein the device is a memory device, wherein the memory device includes one or more memory media.

6. The system according to claim 1, wherein the host comprises a cache memory and the device comprises a main memory for the host, and wherein the messages of the first type and the messages of the second type are write requests and read requests for transferring data between the cache memory and the main memory.

7. The system according to claim 1, wherein a size of the reordering window is smaller than a size of the first buffer, and is advanced as a sliding window over the first buffer.

8. The system according to claim 1, wherein comparing comprises determining whether a number of messages of the first type within the reordering window is greater than a number of messages of the second type within the reordering window or determining whether a ratio of messages of the first type within the reordering window over a total number of messages within the reordering window is greater than 0.5.

9. The system according to claim 8, wherein selecting a message of the first type or the second type from within the reordering window and reordering a plurality of messages including the selected message comprises,
   when it is determined that the number of messages of the first type within the reordering window is greater than the number of messages of the second type within the reordering window or that the ratio of messages of the first type within the reordering window over a total number of messages within the reordering window is greater than 0.5:
   selecting a message of the second type from within the reordering window; and
   advancing a position of the selected message within the plurality of messages.

10. The system according to claim 9, wherein the advancing a position of the selected message in the plurality of messages comprises, when the selected message is a read request inserting the selected message in the first position of the plurality of messages or when the selected message is a write request inserting the selected message at a predetermined position other than the first position in the plurality of messages.

11. The system according to claim 1, wherein packing the reordered plurality of messages into a data transmission structure comprises packing the rearranged plurality of messages into one or more flits at the host request side.

12. The system according to claim 11, wherein the packing the rearranged plurality of messages into one or more flits comprises packing the one or more flits in accordance with rules specified in the CXL specification.

13. The system according to claim 1, wherein a bandwidth utilization of the bidirectional communication interface when the reordered plurality of messages is transmitted is higher than when the plurality of messages is transmitted without the reordering, and wherein the bandwidth utilization comprises utilization of the first unidirectional communication link and utilization of the second unidirectional communication link.

14. The system according to claim 1, wherein a size of the reordering window is dynamically configurable.

15. The system according to claim 1, wherein the first protocol controller is further configured to:

determine whether the reordering window comprises all read requests or all write requests; and when it is determined that the reordering window comprises all read requests or all write requests, packing the plurality of messages, without reordering, into a data transmission structure; and transmitting the packed data transmission structure over the bidirectional communication interface to the device.

16. A protocol controller configured for performing operations comprising:

configuring a reordering window over a subset of messages in a first input buffer of a host system;

comparing a number of messages of a first type and a number of messages of a second type that are present within the reordering window;

based on the comparing, selecting a message of the first type or the second type from within the reordering window and reordering a plurality of messages including the selected message for outbound transmission from the host to a device;

packing the reordered plurality of messages into a data transmission structure; and transmitting the packed data transmission structure over a bidirectional communication interface to a device.

17. The protocol controller according to claim 16, wherein the protocol controller is configured to perform the packing and the transmitting according to the CXL standard.

18. A device comprising:

an interface to a bidirectional communication link;

a CXL protocol controller configured to perform operations comprising:

configuring a reordering window over a transmit buffer of device-to-host response messages;

comparing one or more aspects of messages of a first type and one or more aspects of messages of a second type that are present within a reordering window configured within a buffer of messages including a count of responses with data (DRS) and a count of responses without data (NDR);

based on the comparing, selecting a message of the first type or the second type from within the reordering window and reordering a plurality of messages, including the selected message, in the buffer by advancing the selected message to a predetermined position within the reordering window;

packing the reordered plurality of messages into a flit; and transmitting the packed flit over the interface.

19. The device according to claim 18, wherein selecting a message of the first type or the second type from within the reordering window and reordering a plurality of messages including the selected message comprises, when it is determined that the number of messages of the first type within the reordering window is greater than the number of messages of the second type within the reordering window or that the ratio of messages of the first type within the reordering window over a total number of messages within the reordering window is greater than 0.5:

selecting a message of the second type from within the reordering window; and advancing a position of the selected message within the plurality of messages.

20. The device according to claim 19, wherein the advancing a position of the selected message in the plurality of messages comprises, when the selected message is a read request inserting the selected message in the first position of the plurality of messages or when the selected message is a write request inserting the selected message at a predetermined position other than the first position in the plurality of messages.

* * * * *